United States Patent [19]

Hilliard et al.

[11] Patent Number: 5,479,840
[45] Date of Patent: Jan. 2, 1996

[54] BRAKING SYSTEM FOR PORTABLE MACHINE TOOL

[75] Inventors: James E. Hilliard, Markham; William A. Lane, Brooklin; John W. Bartlett, Pickering; John W. LaBallister, Markham, all of Canada; Frederick B. Jedlicka, Jerseyville, Ill.

[73] Assignee: Emerson Electric Co., St. Louis, Mo.

[21] Appl. No.: 254,505

[22] Filed: Jun. 6, 1994

[51] Int. Cl.$^6$ .......................... B23D 47/02; B60B 33/00; B25H 1/00

[52] U.S. Cl. .................. 83/477.2; 83/574; 83/701; 83/928; 108/18; 16/35 R; 144/286 A; 188/1.12; 188/19

[58] Field of Search .................. 16/35 R; 83/477.2, 83/701, 574, 928; 108/18, 19; 144/286 R, 286 A; 188/1.12, 19; 280/30, 43.24, 651, 655

[56] References Cited

U.S. PATENT DOCUMENTS

| | | | |
|---|---|---|---|
| 2,253,824 | 8/1941 | Townsend et al. | 16/35 R |
| 3,011,531 | 12/1961 | Gaskell | 143/174 |
| 3,409,105 | 11/1968 | Clinton | 16/35 R |
| 4,076,266 | 2/1978 | Krausz | 16/35 R |
| 4,084,663 | 4/1978 | Haley | 188/19 |
| 4,269,096 | 5/1981 | Boone | 83/477 |
| 4,640,326 | 2/1987 | Hewitt | 144/287 |
| 4,846,036 | 7/1989 | Metzger, Jr. et al. | 83/438 |
| 4,860,807 | 8/1989 | Vacchiano | 144/286 |
| 4,969,496 | 11/1990 | Romans | 144/286 |
| 5,181,446 | 1/1993 | Theising | 80/438 |
| 5,205,381 | 4/1993 | Mehmen | 188/19 |
| 5,261,682 | 11/1993 | Chuang | 188/1.12 |
| 5,325,938 | 7/1994 | King | 188/19 |

*Primary Examiner*—W. Donald Bray
*Attorney, Agent, or Firm*—Polster, Lieder, Woodruff & Lucchesi

[57] ABSTRACT

A portable machine tool such as a table saw that can be moved from position to position and locked in place for operation is disclosed. The portable machine tool includes a supporting base and at least one pair of spaced wheels depending from the supporting base adjacent one end. The wheels are capable of being locked in a fixed position to prevent movement of the saw or release of the wheels to enable movement of the saw to a desired position. A movable handle for movement between a first and second position provides joint operation of the wheel locking and wheel releasing elements.

7 Claims, 4 Drawing Sheets

BRAKING SYSTEM FOR PORTABLE MACHINE TOOL

BACKGROUND OF THE INVENTION

The present invention relates to a portable machine tool such as a table saw or the like that can be moved from position to position and then locked in place for operation of same.

A variety of different mechanisms have been constructed for moving table saws, work benches and the like from location to location. For example, U.S. Pat. No. 4,969,496 discloses a supporting frame for a table saw including a handle at one end for lifting and moving the table saw on a pair of wheels between locations. Similarly, U.S. Pat. No. 4,640,326 discloses a supporting frame or stand for a table saw also having wheels for moving the table saw between locations, as well as conventional locking means (not shown) for locking the wheels against further rotation at a desired position. U.S. Pat. No. 4,269,096 further discloses a portable work stand in which portability is achieved through a bicycle type wheel that is capable of being stopped by hand brakes similar to those used in bicycles which force brake shoes against opposite sides of the wheel rim for braking.

From the foregoing discussion, it will be apparent that while wheeled portable table saws and the like have been known in the prior art, very little attention has been given to wheel braking mechanisms, other than by referring to conventional type braking mechanisms, as discussed above. For precisely controlled movement and stopping of machine tools such as table saws and the like, the present invention discloses a novel and unique system/mechanism for controlled actuation by a user, in order to enable portability when desired and wheel locking when the equipment is in use.

SUMMARY OF THE INVENTION

Among the several objects and advantages of the present invention include:

The provision of a new and improved braking system/mechanism in a portable machine tool such as a table saw or the like;

The provision of the new and improved braking system/mechanism in a portable machine tool which provides precise and controlled engagement of wheels for stopping and release of same for portability;

The provision of the aforementioned new and improved braking system/mechanism in a portable machine tool which provides joint operation of the wheel release and locking mechanisms to facilitate operation of same;

The provision of the aforementioned new and improved braking system/mechanism in a portable machine tool which is operated by a single handle that controls both the release and engagement of the braking system/mechanism;

The provision of the aforementioned braking system/mechanism in a portable machine tool which provides a positive gripping and releasing action relative to a pair of spaced wheels associated with the portable machine tool;

The provision of the aforementioned braking system/mechanism which is easy to operate; is durable in construction; is made up of a relatively minimum number of parts; and is otherwise well adapted for the purposes intended.

Briefly stated, the portable machine tool of the present invention includes a supporting base and at least one pair of spaced wheels depending from the supporting base adjacent one end. Wheel locking means are provided for locking the at least one pair of spaced wheels in a fixed position to prevent movement of the machine tool. Wheel releasing means are also provided for releasing the wheel locking means of the at least one pair of spaced wheels to enable movement of the machine tool to a desired position. Movable handle means are provided for joint operation of the wheel locking means and wheel releasing means when moved between predetermined first and second positions.

The wheel locking means includes a bar brake for each wheel that normally urges each spring urged bar brake into braking engagement with one of the spaced wheels when the movable handle means is moved to its first predetermined position. The wheel release means includes a release cable for each wheel that is connected to one of the bar brakes for disengaging same when the movable handle is moved to a second predetermined position.

The first predetermined position of the movable handle is a lower position where each release cable is inoperative and the second predetermined position of the movable handle is an upper position where each release cable is placed in operative condition. Each release cable is placed under tension when the movable handle is moved to an upper position for disengaging each associated spring urged brake bar.

The movable handle is releasably locked when moved to its upper position. The movable handle engages at least one spring loaded locking button mounted to the supporting base when moved to its upper position.

Each spring urged brake bar includes an elongated coil spring having one end mounted to an axle of associated wheel and a second end mounted to a brake spaced from an associated wheel and mounted to the supporting base. Each release cable is connected at one end to a spring urged brake bar bracket and at an opposite end to the movable handle.

These and other objects and advantages of the present invention will become more apparent from the description that follows.

DESCRIPTION OF THE PREFERRED EMBODIMENTS

Figure 1:
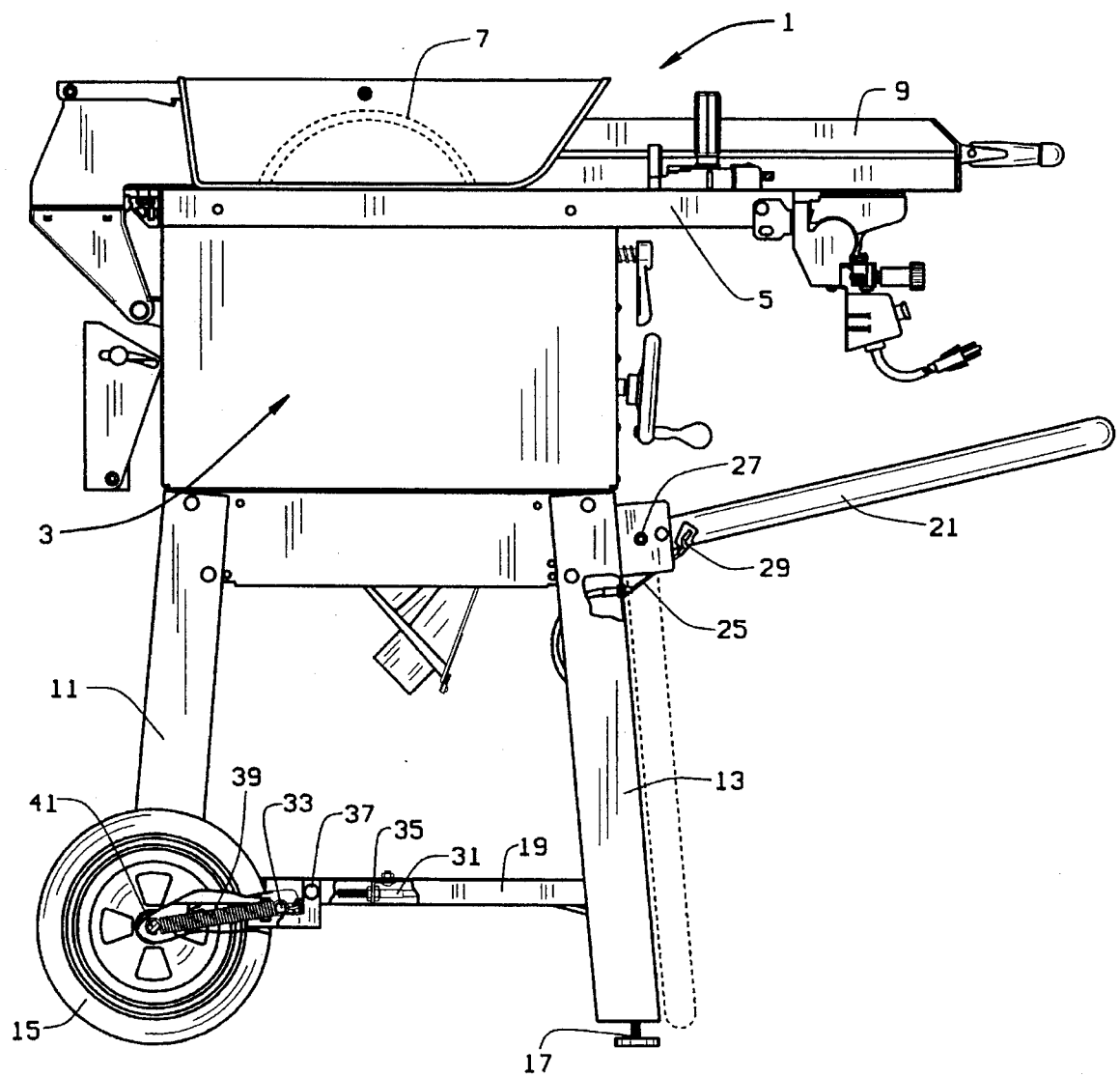
FIG. 1 is a side elevational view of a table saw employing the braking system/mechanism of the present invention.

The following detailed description illustrates the invention by way of example and not by way of limitation. This description will clearly enable one skilled in the art to make and use the invention and describes several embodiment, adaptions, variations, alternatives and uses of the invention, including what we presently believe is the best mode of carrying out the invention.

In the discussion that follows, the term "portable machine tool" includes a table saw such as shown in the drawings as well as any number of portable wood and metal cutting machines that are designed to be moved from place to place by the single handed operation of a user, without the need for a tow motor or other types of moving equipment.

The portable machine tool of the present invention shown as a table saw 1 in the drawings includes a supporting base 3 and a table 5 mounted on the supporting base 3. A rotating saw 7 and a fence 9 are mounted on the table 5. The fence 9 positions workpieces for cutting by the rotating saw 7 to the desired length. All of such features are quite common in the art in a typical table saw environment.

The supporting base 3 includes rear and front base leg supports 11, 13. At the lower end of the rear base leg supports 11 are a pair of spaced wheels 15, 15, while the front base leg supports 13 include spaced leveling feet 17, 17. Quite obviously, the spaced wheels 15, 15 are used for moving the table saw 1 to the desired location while the leveling feet 17, 17 are used to properly level the table saw when located in the desired position. A single brace 19 extends between the rear and front spaced leg supports 11, 13, respectively.

The present invention is directed to a braking system mechanism which locks the spaced wheels 15, 15 or releases same, depending on whether the saw table 1 is desired to be moved or remain in a fixed position. For this purpose, a movable U-shaped handle 21 is mounted to the supporting base 3. In its lower predetermined position shown in phantom lines in FIG. 1 of the drawings, the spaced wheels 15, 15 are in their locked position. When the movable U-shaped handle 21 is moved to its upper position, as shown in full lines in FIG. 1 of the drawings, the spaced wheels 15, 15 are capable of being moved to a desired position. In its upper position, a spring loaded button 42 is mounted to the supporting base for releasably retaining the movable handle 21 in the upper position, as seen by comparing FIGS. 1–2. When the movable U-shaped handle 21 is disengaged from the spring loaded button 42 for movement to its lower predetermined position, as shown in phantom lines in FIG. 1 of the drawings, the spaced wheels 15, 15 are maintained in wheel locked position.

Figure 3:
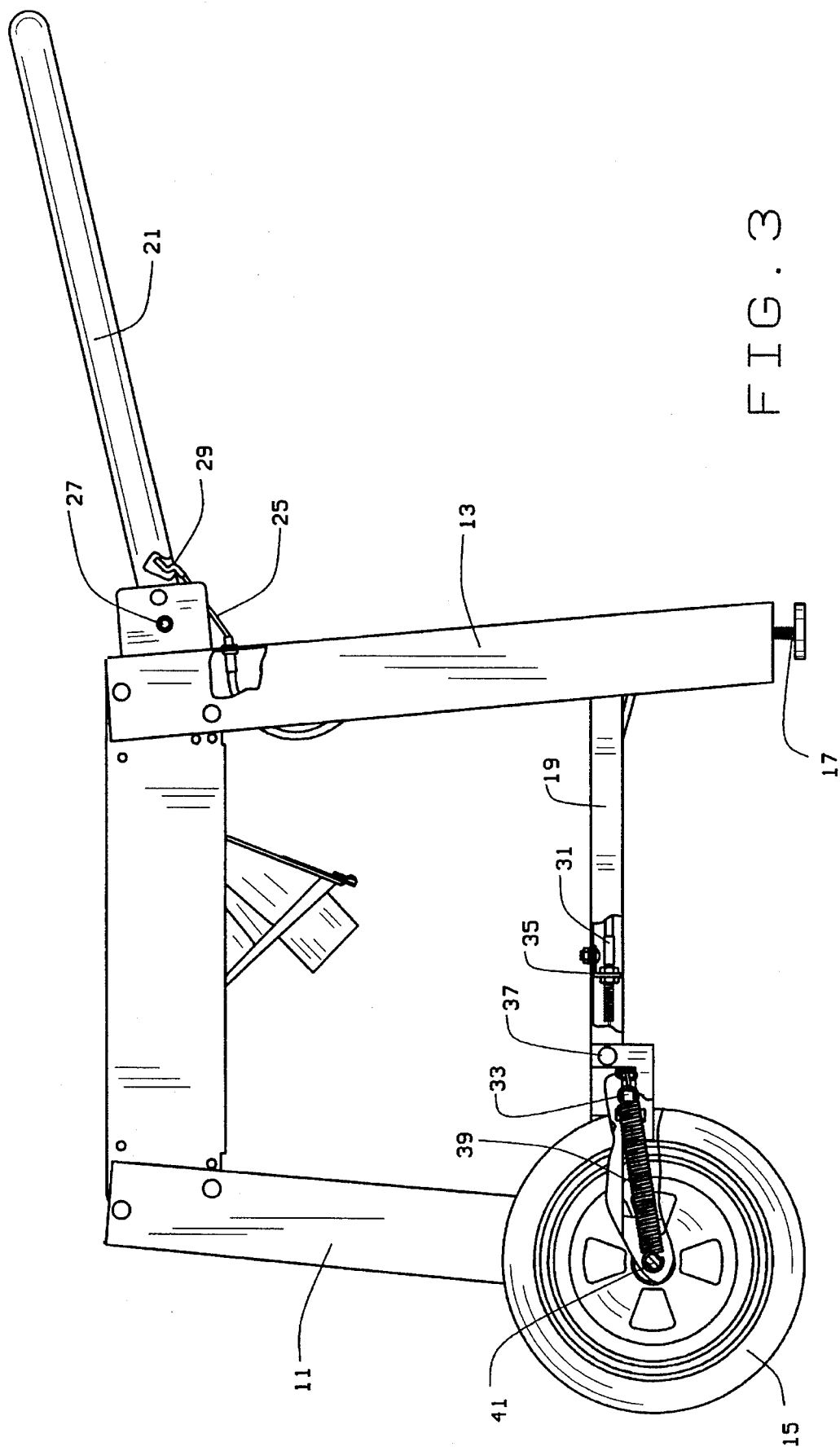
FIG. 3 is an enlarged fragmentary view of the braking system/mechanism of the present invention when located in a released or inoperative condition.
Figure 4:
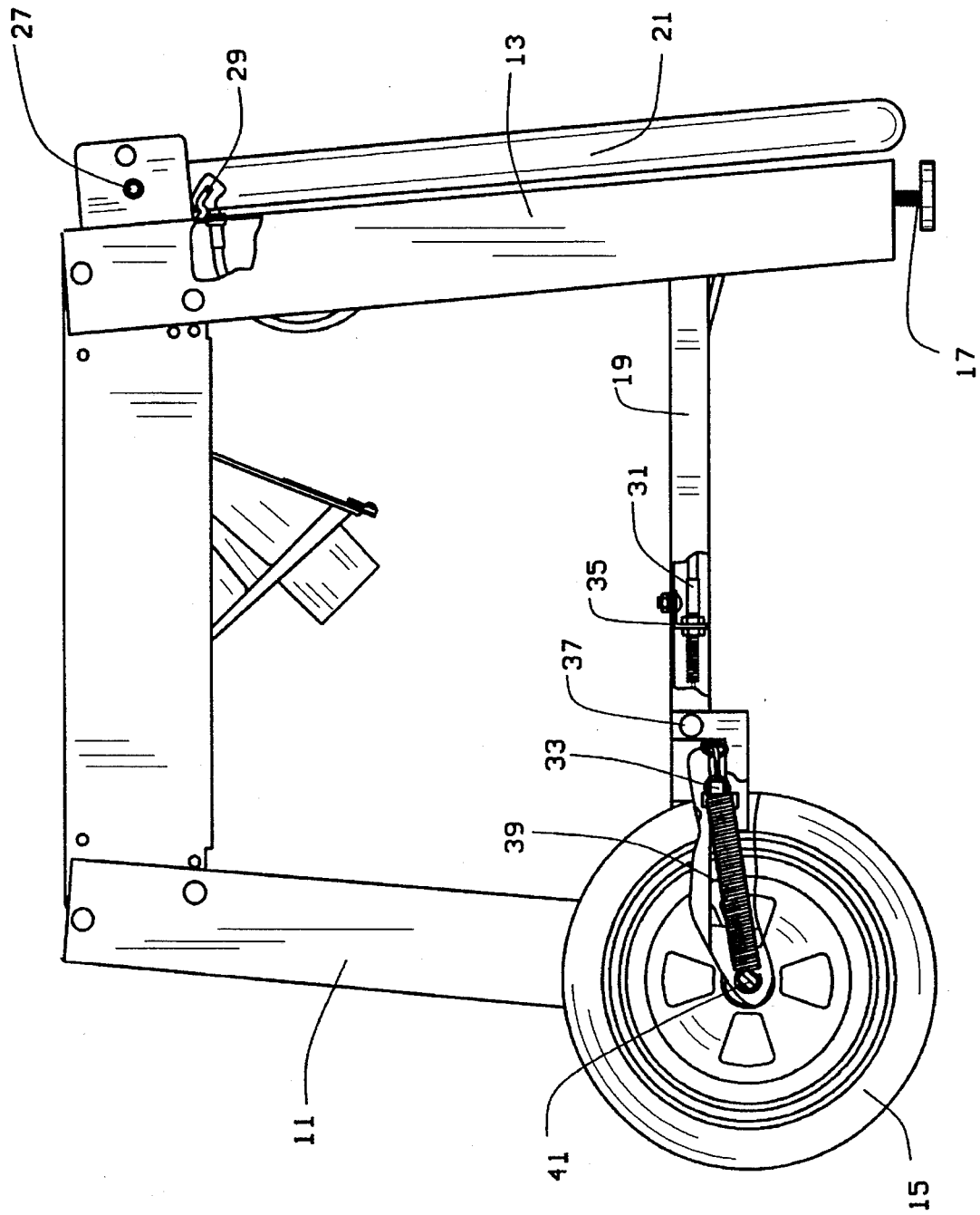
FIG. 4 is a fragmentary enlarged elevational view of the table saw specifically illustrating the braking system/mechanism of the present invention when moved to a wheel locking position; and Corresponding reference numerals will be used throughout the several figures of the drawings.

The specific braking system/mechanism for engaging and disengaging the spaced wheels 15, 15 can best be understood by reference to FIGS. 3–4 of the drawings.

Figure 2:
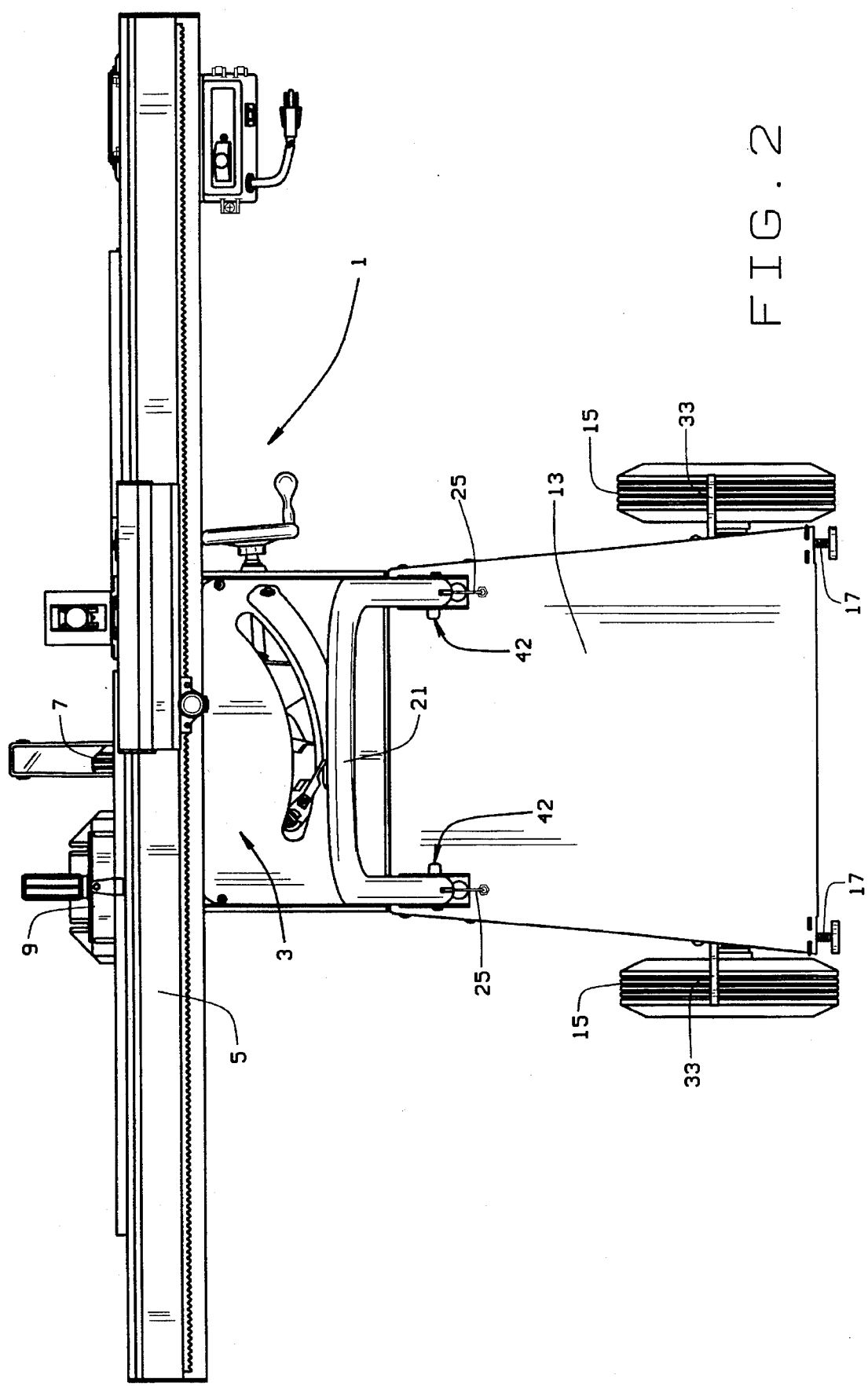
FIG. 2 is an end elevational view of the table saw shown in FIG. 1.

For operating the wheel locking and wheel release mechanisms presently to be described, a cable 25 is connected to the U-shaped handle 21, at each end thereof adjacent its pivot mounting 27 relative to the supporting base, as best seen in FIG. 3 of the drawings. The upper end 29 of each cable 25 is connected to the U-shaped handle 21 through a complementary opening extending therethrough, while the lower end 31 is connected, through various components presently to be described, to a spring urged brake bar 33 that engages the outer surface of each spaced wheel 15 in braking engagement, as shown in FIG. 2.

The lower end 31 of the release cable 25 is supported within the brace 19 by a cable bracket 35 that is mounted to the brace 19 by suitable fasteners or the like. The lower end 31 of the cable extends beyond the cable bracket 35 and is connected to bar brake 33. The brake bracket 37 includes the wheel brake 33, at an opposite end of the L-shaped bracket 37 from its connection with the lower end of the release cable 31. A helical coil spring 39 has one end secured to the brake bar 33 and the other end to the wheel axle 41. The arrangement of the coil spring 39 relative to the bar brake 33 is such that when the release cable 25 is not under tension, that is, when the U-shaped movable handle is in its lower predetermined position as shown in FIG. 4 of the drawings, the bar brake 33 is spring urged into braking engagement with its associated wheel 15 to prevent movement of the saw table 1. However, when the U-shaped movable handle 21 is moved to its upper predetermined position as shown in FIG. 3, the release cable 25 is placed under tension which pulls the L-shaped bracket 37 and its associated bar brake 33 out of braking engagement relative to an associated wheel 15 by stretching the spring 39 beyond its normal spring urged brake bar contact with a respective wheel 15. As a result, the saw table 1 can be moved to a desired location. At the desired location, the U-shaped movable handle 21 is returned to its lower predetermined position as shown in FIG. 1 of the drawings where the saw table can now be operated as desired. The leveling feet 17 can be adjusted as desired to provide for proper leveling position of the saw table, as will be apparent.

From the foregoing, it will now be apparent that the portable machine tool of the present invention, illustrated as a table saw in the drawings, provides wheel locking means for locking at least one pair of spaced wheels in a fixed position to prevent movement of the machine tool and wheel releasing means for releasing the wheel locking means of the at least one pair of spaced wheels to enable movement of the machine to a desired position. For this purpose, a movable handle provides joint operation of the wheel locking means and the wheel releasing means when moved between predetermined first and second positions. As a result, the portable machine tool can be easily moved to a desired location and then locked in a fixed position at the desired location for operation of the machine tool.

In view of the above, it will be seen that the several objects and advantages of the present invention have been achieved and other advantageous results have been obtained. As various changes could be made in the above constructions without departing from the scope of the invention, it is intended that all matter contained in the above description or shown in the accompanying drawings shall be interpreted as illustrative and not in a limiting sense.

We claim:

1. A portable table saw comprising:

a supporting base for the table saw;

a pair of spaced wheels underlying one end of the supporting base and foot elements underlying an opposite end of the supporting base;

wheel locking means including movable handle means for locking the pair of spaced wheels in a fixed position to prevent movement of the table saw;

wheel release means including said movable handle means for releasing the wheel locking means from the pair of spaced wheels to enable lifting of said supporting base and movement of the machine tool through said spaced wheels to the desired position;

movable handle means for joint operation of the wheel locking means and wheel release means when moved between first and second predetermined positions;

said wheel locking means including a spring urged bar brake for each wheel for normally urging each spring urged bar brake into braking engagement with one of said spaced wheels when the movable handle means is moved to said first predetermined position; and said wheel release means including a release cable for each wheel that is connected to one of said spring urged bar brakes for disengaging same when said movable handle is moved to said second predetermined position.

2. A portable machine tool comprising:

a supporting base for the machine tool;

base leg supports depending from opposite ends of the supporting base each terminating in a lower end;

one pair of spaced wheels mounted adjacent the lower end to the base leg supports at one end of the supporting base;

leveling feet mounted adjacent the lower end to the base leg supports at the opposite end of the supporting base;

spring urged brake bars operating to engage one of each of the spaced wheels in braking engagement;

a release cable connected to each spring urged brake bar operating to disengage the spring urged brake bar engaging each wheel; and a movable handle mounted to the supporting base and connected to each release cable; said movable handle being movable to a first predetermined position for non-operative engagement with each release cable to enable an associated spring urged brake bar to jointly operatively engage one of the spaced wheels in braking engagement; said movable handle also being movable to a second predetermined position for joint operative engagement with each release cable for disengaging the spring urged brake bar associated with each one of said wheels;

whereby the portable machine tool can be tilted onto the spaced wheels when the spring urged brake bars are moved out of braking engagement with each wheel by locating the movable handle in its first predetermined position and moved to a desired location where the spring urged brake bars can operatively re-engage each wheel when the movable handle is moved to its second predetermined position.

3. The portable machine tool as defined in claim 2 wherein the first predetermined position of the movable handle is a lower position where each release cable is inoperative and the second predetermined position of the movable handle is an upper position where each release cable is placed in operative condition.

4. The portable machine tool as defined in claim 3 wherein each release cable is placed under tension when the movable handle is moved to an upper position for disengaging each associated spring urged brake bar.

5. The portable machine tool as defined in claim 4 wherein the movable handle is releasably locked when moved to its upper position.

6. The portable machine tool as defined in claim 5 wherein the movable handle engages spring loaded locking means mounted to the supporting base when moved to its upper position.

7. The portable machine tool as defined in claim 6 wherein each spring urged brake bar includes an elongated coil spring having one end mounted to an axle of an associated wheel and a second end mounted to a bracket spaced from an associated wheel and mounted to the supporting base, each release cable being connected at one end to each spring urged brake bar bracket and connected at an opposite end to the movable handle.

* * * * *